Aug. 18, 1936.  W. D. FOSTER ET AL  2,051,789
APPARATUS FOR GUIDING AND HANDLING STRIP MATERIAL
Original Filed April 4, 1929   4 Sheets-Sheet 1

INVENTOR
WARREN DUNHAM FOSTER.
FREDERICK DAVENPORT SWEET.
BY Warren D. Foster
ATTORNEY Aug. 18, 1936.   W. D. FOSTER ET AL   2,051,789
APPARATUS FOR GUIDING AND HANDLING STRIP MATERIAL
Original Filed April 4, 1929   4 Sheets-Sheet 2
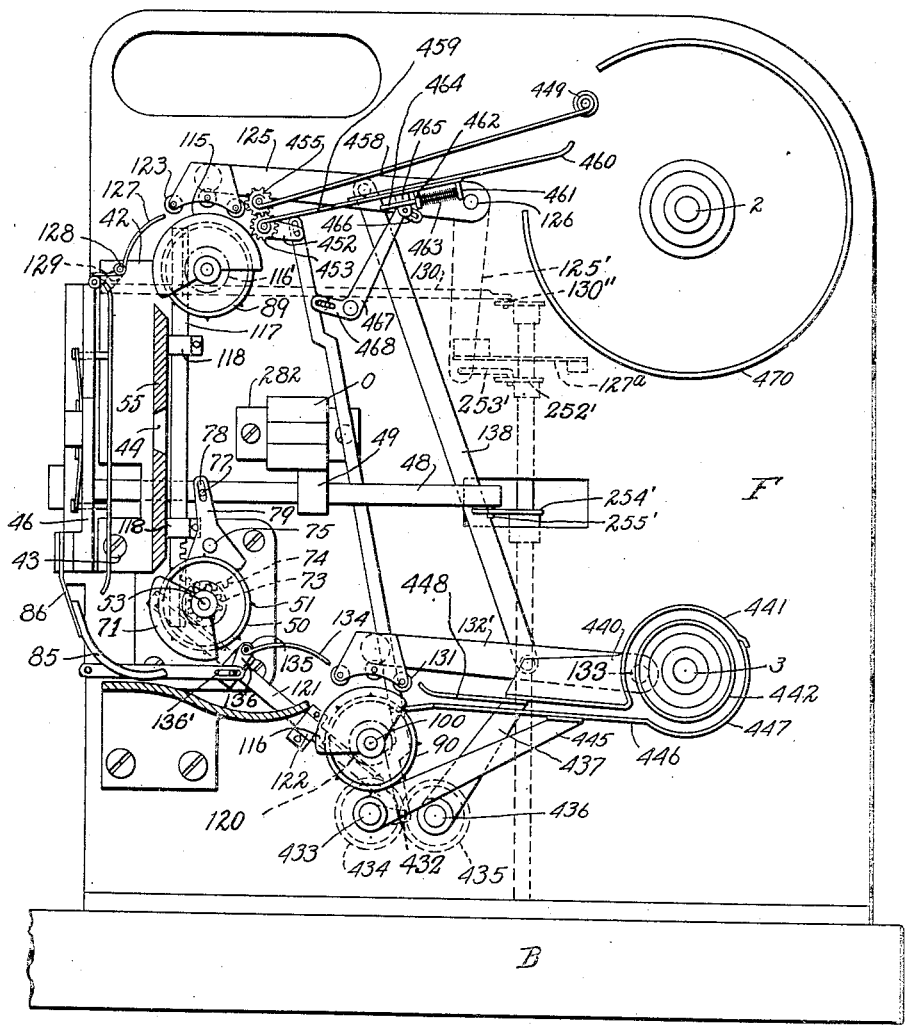
Fig. 2
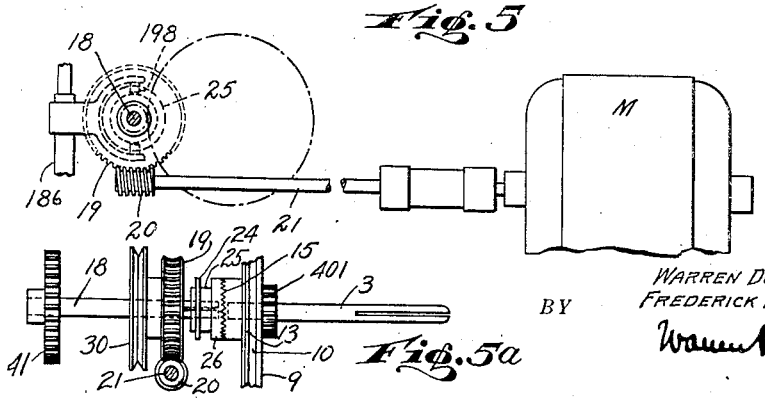
Fig. 5
Fig. 5a
INVENTOR
WARREN DUNHAM FOSTER.
FREDERICK DAVENPORT SWEET.
BY
ATTORNEY

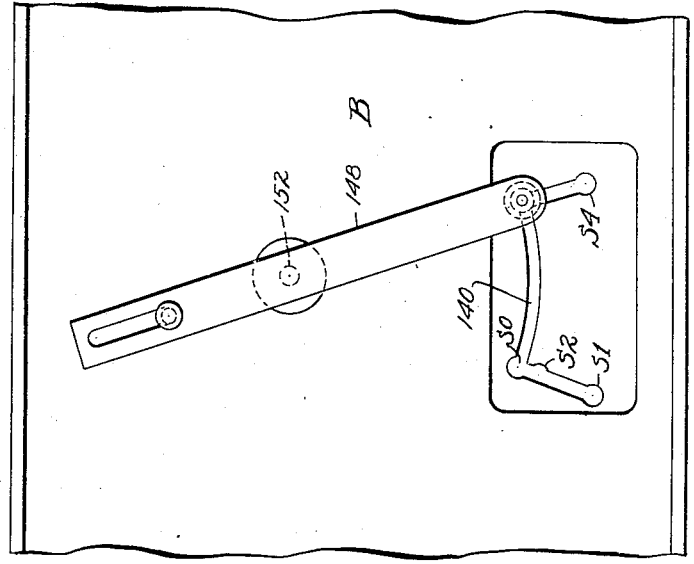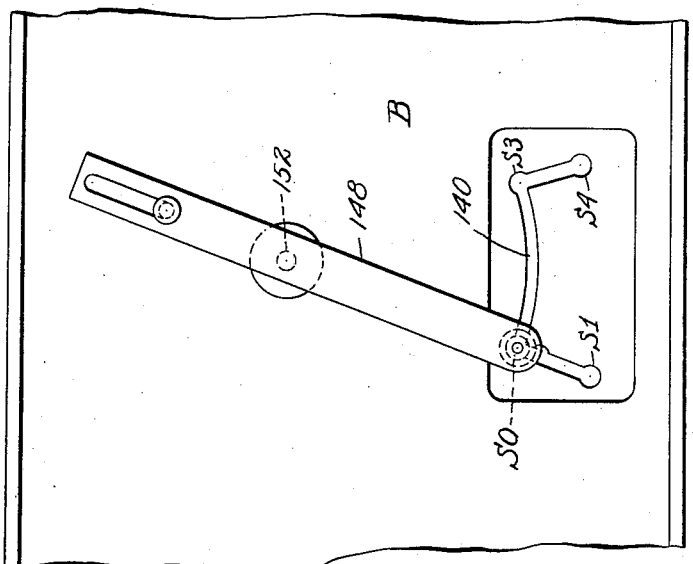

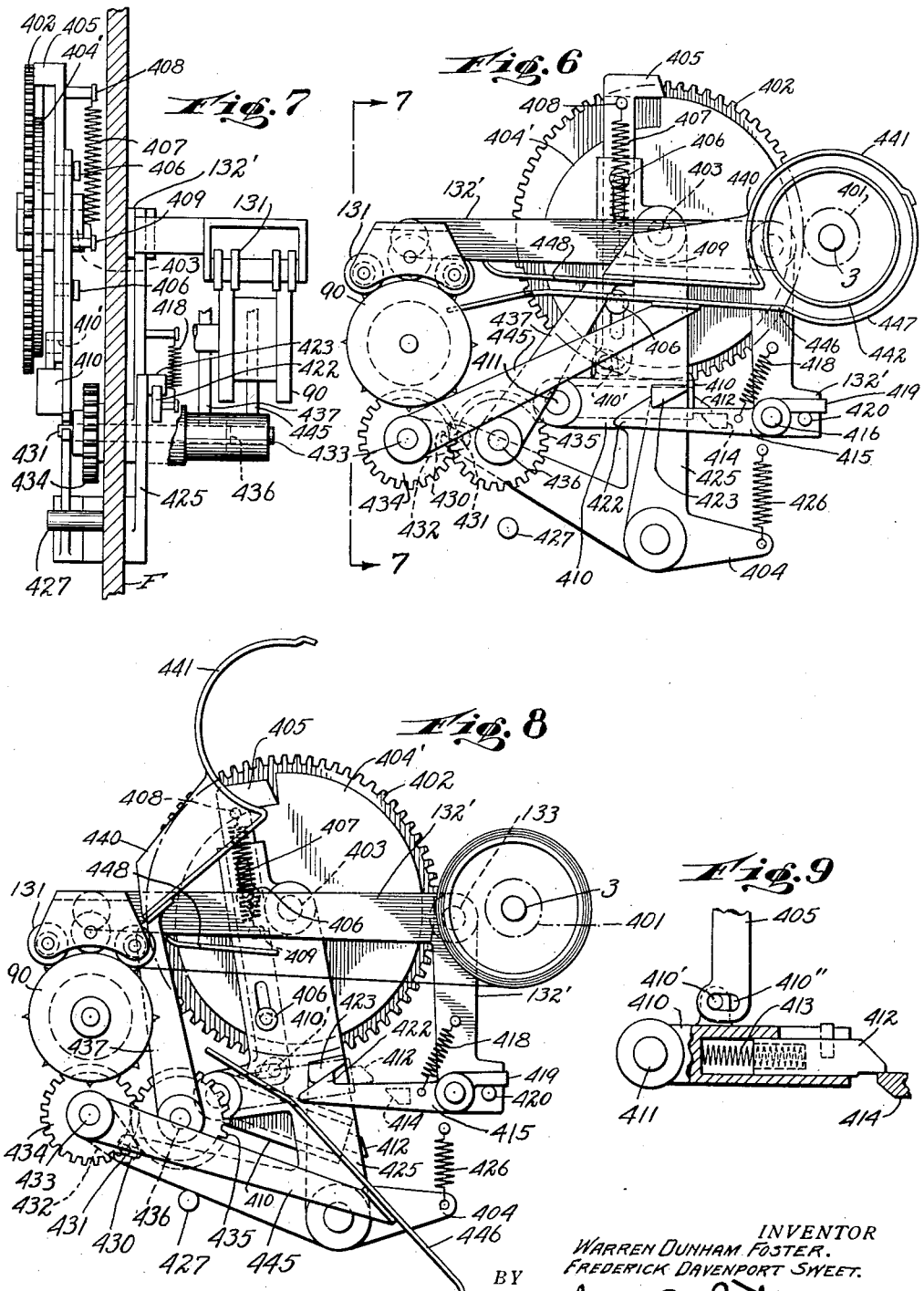

Patented Aug. 18, 1936

2,051,789

UNITED STATES PATENT OFFICE 2,051,789

APPARATUS FOR GUIDING AND HANDLING STRIP MATERIAL

Warren Dunham Foster, Washington Township, Bergen County, N. J., and Frederick Davenport Sweet, New York, N. Y., assignors, by direct and mesne assignments, to Kinatome Patents Corporation, Ridgewood, N. J., a corporation of New York Original application April 4, 1929, Serial No. 352,525, now Patent No. 1,993,735, dated March 12, 1935. Divided and this application March 11, 1935, Serial No. 10,559

27 Claims. (Cl. 242—55)

The present invention is illustrated as applied to the art of photography and more particularly to improvements in apparatus adapted for the handling and guiding of films, whether for the projection or taking of successive pictures or for reproduction or recordation upon films of images representing sound as in a film playing phonograph or for the reproduction or recordation of such images in conjunction with images of things. It will be readily understood, however, that the present invention is directly applicable to many other types of apparatus which handle material in strip form.

The present invention is a division of our copending application, Serial Number 352,525, filed April 4, 1929, which upon March 12, 1935, became Patent Number 1,993,735. The present application describes and specifically claims an improved form of operable guiding mechanism to direct a film or other strip of material from or to a core placed upon a spindle, improved control means for such guiding mechanism, and operative interconnection between such guiding mechanism and pressing means for holding such a film or other strip in operative relation to a feeding member which is associated therewith. It also describes and claims the operation of such guiding means either independently or in cooperation with such film pressing means by an operative interconnection with a revoluble spindle whereby the revolution of said spindle operates said guiding means. Attention is directed to our copending application filed concurrently herewith, Serial Number 10,560, likewise a division of our parent case. In said co-pending divisional case we describe and claim other means for operating such guiding means, particularly such means as are moved away from guiding position in gradual or other timed relation to the increase of the mass of film upon the core of the spindle. In said other co-pending application we also describe and claim a timing of the actuation of the mechanism which moves said guiding means as well as the timing of such movement itself. In our parent application and in still a third co-pending divisional application, filed concurrently herewith, Serial Number 10,558 we describe and claim the operation and control interrelation of such guiding means in combination with that of other operable members of the apparatus, always exclusive of the presser members.

In apparatus such as is described and claimed herein, the user places a full reel of film or other strip material on a delivery spindle, a tunnel-like guiding channel having been created between that spindle and a take-up spindle in accordance with our parent application and our divisional application Serial Number 10,558, and starts mechanism which rotates both the delivery and the take-up spindles in a feeding direction. Guiding mechanism is automatically brought into lightly resilient contact with the outer periphery of the delivery reel so that the leading end of the film upon the revolution of the spindle is picked up by this guiding mechanism and automatically directed through said cleared channel to other similar mechanisms associated with the core of the carrier placed upon the taking up spindle and directed thereabout. As the mass of film upon the take-up carrier increases, obviously the guiding mechanism associated therewith must be removed from a position adjacent the core and it is also desirable that the upper portion of the guiding mechanism be removed from contact with the film in order to avoid needless wear and possible scratching. This removal is automatically controlled by a direct operative interconnection between the take-up spindle and the initial guiding mechanism so that upon a predetermined number of revolutions, irrespective of the size of the film carrier, the thickness of the film, or other adventitious conditions, the guiding members are removed from guiding relation at a specific point in the operating cycle. As described in certain forms of our parent application, we may prefer to force the free end of the film through this cleared channel not by contact between the perforations therein and a toothed member, but merely by the rotation of the mass itself, or as described herein we may prefer to place the perforation of the film in operative relation with toothed members before the leading end reaches a core upon the take-up spindle. According to the disclosures of our parent and divisional applications, however, this contact may be secured according to either manner. In either event, however, it is highly desirable to operate the presser members by or concomitantly with the unitary control mechanism which moves the guiding members associated with the delivery and take-up members. Also it is desirable automatically to remove the presser members from pressing relation of the film in conjunction with the moving of the guides to their initial guiding relation with the film. Such operative interrelation is supplied by our invention as described and claimed herein. Also it will be obvious that in connection with the initial removal of the film from the outer periphery of the delivery carrier, an elongation of the guiding mechanism in a direction roughly parallel with the film path is necessary. Also, after the leading end of the film has been directed away from the delivery carrier, it is desirable to remove this forwardly projected guide from further contact with the film. Control mechanism to accomplish these results is provided.

From the foregoing statement and from certain of the statements of our parent application it will be evident that an important object of the present invention is to provide means whereby a film or other strip of material may be automatically threaded in a film or strip handling apparatus with particular relation to the film supporting spindles and the feeding members which draw the film from one of said spindles or advance it toward the other of said spindles. A further object of the present invention is to provide entirely mechanical and positive means, preferably without putting any special strain or tension upon the film, whereby said guiding and pressing means are automatically and positively operated. It has previously been proposed that the pressure of the mass of film as it piles up about the core of the take-up carrier releases a latch and permits a spring to move the guiding members from guiding position and thereby destroys the channel. In the present invention an improved result is obtained by utilizing the powered and positive revolutions of the take-up spindle itself to operate the means which control the guiding members and destroy the channel. In mechanism which depends upon the building up of the mass of the film, the diameter of the core of the particular carrier which happens to be employed, the thickness of the film itself, or the tightness with which it happens to be coiled about the core, or other conditions which vary from day to day, determine the point at which the movement of the guides takes place. Moreover, the actuation of this movement places a certain strain upon the film and requires an actuating element which rubs against the surface of the film. An apparatus constructed according to our invention always moves the guiding member at exactly the same time in the cycle of operations. In apparatus constructed in which the film itself operates the means which move the guiding member, it has been necessary to make these guiding members extremely light in order that they may readily be moved or actuated by the film. As a consequence, such an apparatus is delicate and easily bent or otherwise brought out of alignment. In an apparatus constructed according to our invention, however, these guiding members may be made as heavy and rigid as desired since their movement away from the film is under power which is applied by a motor driven timing device.

A further object of the present invention is to provide similar guiding means cooperating with the supply spindle whereby the free end of a film positioned thereupon may be directed to the cooperating feeding member. A further object is to control such supply spindle guiding means in the appropriate timed or sequential relation to the operation of the take-up guiding means and to the actuation of all feeding members and the operation of all other guides and the gate. Such supply spindle guiding means include a fixed section surrounding the carrier upon the supply spindle and cooperating with the operable portion of the guiding means whereby the free end of a film upon such carrier, no matter what the position of such free end, will be directed between the operable guiding members and to the feeding members. That operable portion includes a roller placed upon one of the extended guiding members and a shovel-like resilient extension mounted upon the other or of the longitudinally extended guiding member and movable toward and away from the entire mass of film which picks up the free end of the film as the spindle revolves and directs it forwardly into the channel.

An object of the present invention is to actuate each of the above mentioned elements and all of the elements of the apparatus described herein in that timed sequential or otherwise related manner which will result in the completely automatic actuation and operation of the apparatus.

We prefer to illustrate our invention as applied to a film handling apparatus of the type disclosed and claimed in Patent Number 1,894,963, dated January 24, 1933, to Barton Allen Proctor, and co-pending with our parent application, although it will be readily understood that our invention may be applied to other types of apparatus and subjected to control other than that of the sequential and unitary type disclosed in said patent. Also, as stated in our parent application, the control mechanism hereof may be electrically operated, as taught in Patent Number 1,943,303, to Warren Dunham Foster, dated January 16, 1934, or photoelectrically operated, as stated in Patent Number 1,944,024, to said Foster and Earle L. Parmelee, likewise dated January 16, 1934, said patents having been co-pending with our parent application.

While we describe our invention as applied to a film handling apparatus in which loops are provided, it will be understood that its features may be utilized equally well in connection with the tension control system of feeding as disclosed and claimed in Patent Number 1,944,022 to Clarkson Ulysses Bundick and Barton Allen Proctor, said patent having been co-pending with our parent application, and that many features thereof may be applied to apparatus in which the film is moved continuously as for sound recordation or reproduction or in conjunction with optical rectification of the image.

Other objects advantages and characteristics of the present invention are apparent in the following description, the attached drawings, and the subjoined claims. Although we are showing one preferred embodiment of our invention, it will be readily understood that we are not limited to this particular construction as changes can readily be made without departing from the spirit of our invention or the scope of our broader claims.

In the drawings:

Figure 1a is a view taken on the line 1a—1a of Figure 1; and Figure 1b is a plan view of the same;

Figure 2 is a partial side elevation broken away in part, to show actuating parts in film threading position, certain parts being omitted for clarity;

Figure 3 is a partial bottom plan view showing actuating levers in the "intermediate" position S0;

Figure 4 is a partial bottom plan view showing actuating levers in "film threading or changing" position, with the control button at station S3;

Figure 5 is a fragmentary left side elevation, partly in section, showing the mechanism which may drive the take-up spindle, and Figure 5a is a fragmentary front view of said mechanism;

Figure 6 is an enlarged detail view of the take-up guiding mechanism in operative position;

Figure 7 is a view taken on the line 7—7 of Figure 6 looking in the direction of the arrows;

Figure 8 is a view corresponding to Figure 6, the parts being in inoperative guiding position;

Figure 9 is an enlarged detail view of a portion of the operating trigger and primary latch controlled thereby;

Figure 10 is a sketch showing spring members added to the take-up guiding members.

Figure 1:
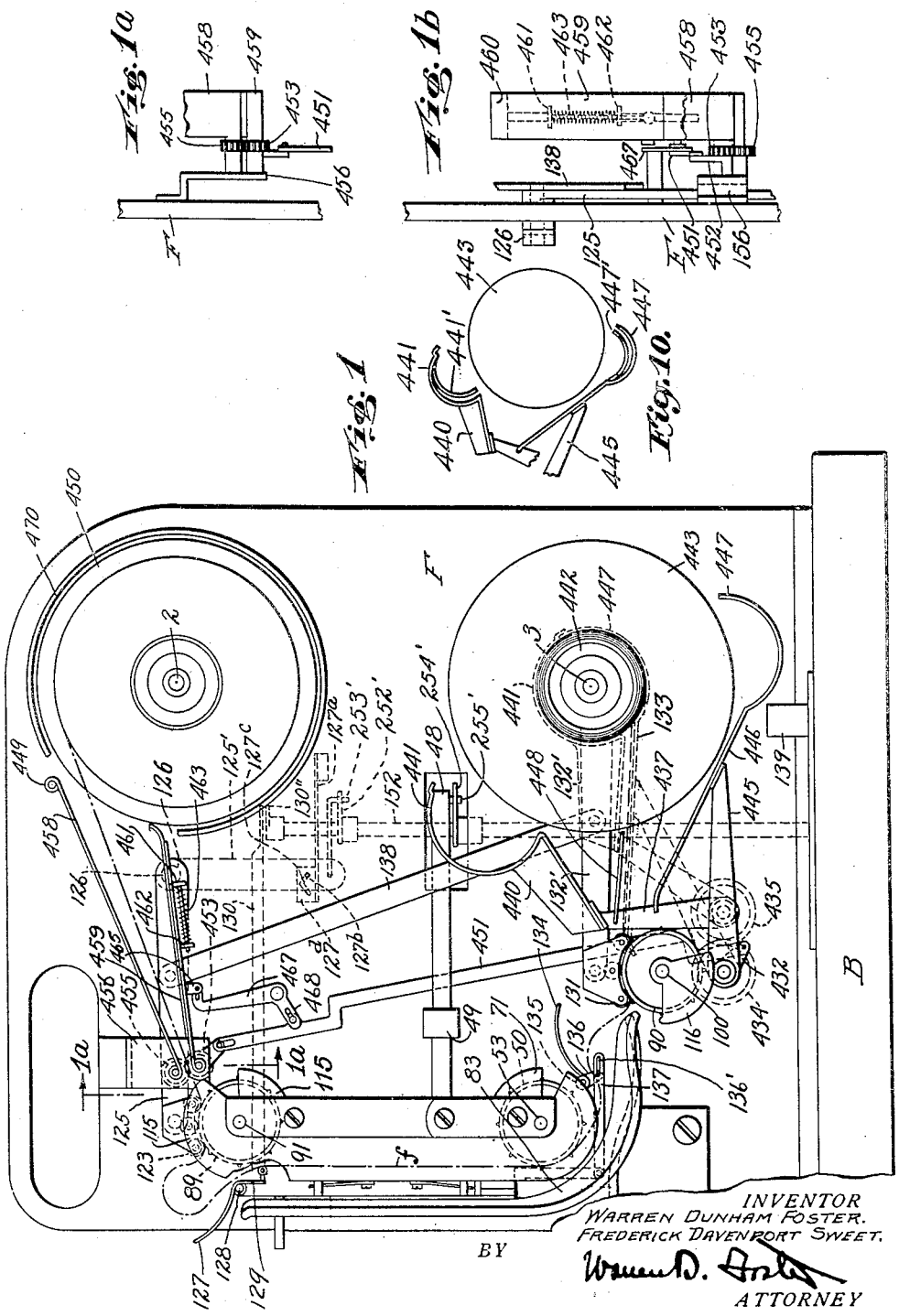
Figure 1 is a right side elevation of the machine, certain parts being omitted for clarity.

In carrying out the present invention, there may be provided an apparatus comprising a supporting base B having mounted thereon a lamp and resistance containing housing not shown and a supporting frame F upon which are mounted the operating parts of the film feeding and controlling mechanism per se.

For simplicity, the same reference characters are used herein as in our parent application.

Preferably carried by the frame F and projecting from one side thereof in predetermined spaced relation are carrier receiving spindles 2 and 3, the spindle 2 being adapted for the holding of a reel of film during the feeding movement thereof and adapted to effect rewinding of the film at the conclusion of the feeding movement, while the spindle 3 is adapted to be driven during the feeding movement for coiling the film as required.

The spindle 3, which will hereafter be referred to as the take-up spindle, is journaled for rotation in the frame F.

As best shown in Figures 5 and 5a of the drawings, the take-up spindle 3 may be driven through a slip clutch including the discs 9, 10 and 13, as is fully described in our parent case, by a shaft 18 which through a worm wheel 19 and a worm 20 is operated by a shaft 21 which is revolved by a motor M. To transmit the power of the driving shaft 18 to the driven spindle 3, a clutch comprising cooperatively toothed serrated members 15 and 26 may be employed, the member 26 having a slot 25 formed by an extension 24 in which clutch fingers 198 are operated under the control of a manually movable shaft 186 operated concomitantly with the shaft 152 under the control of the manually movable control button 139, all as explained in detail in our parent case.

A spindle 2, which will hereinafter be designated as the delivery or supply spindle, is mounted similarly to the take-up spindle 3. As described in our parent case it may be driven in a projecting direction through mechanism which includes a pulley 30 pinned to the shaft 18 in order initially to advance the film or it may be driven in a rewinding direction through mechanism which includes a gear 41 also pinned to the shaft 18 in order to rewind the film after it has been projected or exposed.

Interposed between the delivery spindle 2 and the take-up spindle 3 are feeding members which advance a film in a projecting or exposing direction and also gate, guides, and presser members which alternatively create a clear threading path free from interruption from teeth of the feeding members and a projecting or exposing path in which the film is held in operative relation to various feeding members. Since guiding members which are interposed between the delivery spindle and an adjacent feeding member co-operating therewith and between the take-up spindle and an adjacent feeding member co-operating therewith form a part of these path defining elements and are claimed herein in certain combinations, it is necessary briefly to describe all of the path defining elements and feeding members, although it is to be understood that claims to them in various combinations are included in our parent case.

We prefer so to construct the gate that the film may be initially positioned in respect thereto either by the operation of a feeding member which propels the free end of the film between the sections of the gate or by a single lateral manual movement of the film relatively to the gate. We prefer also to make use of the construction shown in the said constructively co-pending Proctor patent by reason of which it is possible at any time to stop the operation of the apparatus, open the gate, move the guiding elements associated therewith to inoperative position, and manually remove the film from the gate by a movement at right angles to its path of travel therethrough. In other words, we may employ end-wise threading, or side-wise threading, or removal or both.

Mounted on the frame F we may place a gate section 42 preferably secured in any desired manner as by screws 43 against movement relatively to the frame. This section is preferably formed with an aperture 44 through which light may be projected as well understood in the art, and with a film guiding depression extending lengthwise of the section and intersecting the aperture 44 for the travel of the film, such depression preferably being of great depth relatively to the thickness of the film. Cooperating with the section 42 is a relatively movable section 46 secured to one end of the gate opening rod 48 slidable through a suitable opening in the gate section 42 and a suitable bearing 49 on the frame F. The usual spring pressed pressure plate is mounted on the movable gate section. By reason of this construction, it will be apparent that when the rod 48 is moved to the left as viewed in Figure 1 or 2, it will be effective for moving the section 46 away from the section 42 thus relieving the pressure between the sections and permitting the removal of one film or the insertion of another film, such insertion being accomplished either by propulsion or by a manual lateral movement, while movement in the opposite direction will bring the sections into cooperative relation.

For effecting the desired intermittent feeding motion of a film in position in the gate, there may be provided a feeding sprocket 50 having film engaging teeth 51 adapted to engage perforations substantially peripherally positioned in the film f. This sprocket is mounted on a shaft 53 extending transversely through the frame F and intermittently driven through the mechanism described in the said Proctor patent or in our parent application or in any desired or conventional way by mechanism driven by the motor M.

Cooperating with the sprocket 50 and normally occupying the position illustrated in Figure 1 of the drawings, is a stripping and guiding and protecting shield 71 mounted loosely upon the sprocket shaft 53. Secured to the inner side of the shield 71 is a pinion 73 with which meshes an arcuate rack 74 having a pivotal mounting 75 and operated simultaneously with the operation of the gate rod 48 by means of a pin 77 projecting outwardly from the gate opening rod and engaging a slot 78 in the extension 79 of the arcuate rack. With the construction just described, movement of the gate opening rod to the left as viewed in Figure 1 for the purpose of opening the relatively separable gate sections, will effect rotation of the rack in a counterclockwise direction as viewed in this figure, thereby rotating the shield in a clockwise direction. This rotational movement of the shield will be effective for engaging the film $f$ and stripping the same from the sprocket preparatory to the removal of the film from the apparatus. During the application by lateral or endwise movement of a new film or during rewinding, it will remain in this position, preferably covering all of the teeth of the sprocket which are exposed during the feeding of the film. Thus the threading operation of the film is greatly expedited, and the film completely protected from all teeth during such changing operation or during rewinding.

Conventionally positioned above and below the gate we place continuous sprockets 89 and 90. The former, hereafter called the supply or delivery sprocket, draws film from the supply or delivery carrier, and the latter, hereafter called the take-up sprocket, takes the film away from the intermittent sprocket 50 and moves it toward the take-up reel. As described in our parent application these three sprockets may be driven by the motor M and controlled by a system of articulated clutches, or any desired or conventional driving or controlling mechanism may be employed.

We provide stripping and protective shields 115 and 116 cooperating with the continuously driven sprockets 89 and 90, and similar in operation to the shield 71 which cooperates with the feeding sprocket 50. The shield 115, mounted upon the sprocket shaft 91, is operated by a pinion 116' which meshes with a toothed bar 117 supported as in a bearing 118 and at its opposite end engaging with a pinion which is mounted for movement with the pinion 73. Similarly, the shield 116 is mounted upon the sprocket shaft 100 and is operated by the pinion 120 which meshes with a toothed bar 121, supported as in a bearing 122, and at its opposite end engaging with the pinion which is mounted for movement with the pinion 73.

The operation of such shields will be obvious from Figure 2. As the rod 48 is moved, in the manner previously described, it will be effective for operating the shield 71, and, with it, the shields 115 and 116. Thus the movement of the rod 48 to the left as viewed in Figure 1 will be effective to move all shields from the inoperative positions to the protective position, in timed relation to the opening of the gate, thus removing the film from the teeth of the sprockets and completely shielding it therefrom. That is to say, such movement will move the shielding members from the position in which they are shown in Figure 1 to those in which they are shown in Figure 2.

Film guides and film retaining members cooperating with the gate and with the feeding mechanisms are provided.

A film retaining element, preferably consisting of three rollers or idlers 123, relieved as is common in the motion picture art, is mounted for movement with the plate 125 which is attached to and pivoted upon the stud 126 extending through the frame F and attached to the downwardly extending arm 125', such retaining element being held in cooperative relation with the delivery sprocket 89 by the tension of the spring 127a.

An upper loop guiding element, preferably consisting of a curved plate 127, is pivotally mounted upon the pin 128, extending from the main frame adjacent the upper portion of the gate, and attached to an arm 129 to which is connected the link 130, such link being attached by a pin to an elongated slot in the arm 130" attached to the gate control rod 152.

A similar retaining element, preferably consisting of three rollers or idlers 131, relieved as is common in the motion picture art, is mounted for movement with a plate 132', which plate is attached to and pivoted upon the stud 133 extending from the front of the frame F.

A lower loop guiding element, preferably consisting of a curved plate 134, is pivotally mounted upon a pin 135, extending from the main frame adjacent the lower portion of the gate. Attached to such plate 134 is an arm 136 which by means of a pin extending therefrom into an elongated slot 136' of the link 137 is attached to and moves with the movable gate section 46.

To actuate the film retaining element positioned adjacent the lower portion of the gate in timed relation with the film retaining element positioned adjacent the upper portion of the gate, the plates 125 and 132' are joined by the link 138.

By reason of such construction, it will be evident that when the plates 125 and 132' are moved upwardly, as viewed in Figure 1, by means later described, the film retaining rollers 123 and 131 will likewise be moved upwardly away from the sprockets 89 and 90. By means later described, the loop guiding plates 127 and 134 will likewise be moved downwardly, thus completing the track or path for the film from the supply sprocket through the gate to the take-up sprockets, such movements of such elements being effective to facilitate the positioning of a new film or the edge-wise removal of one already displayed. Similarly, the downward movement of the plates 125 and 132' will be effective to bring the guiding elements 123 and 131 into cooperative relation with the sprockets 89 and 90 respectively, thus positioning the film thereupon and retaining it in cooperation therewith. By means later described the guiding plates 127 and 134 will be simultaneously moved upwardly and away from the film track, thus permitting the unimpeded production of the loops of slack film, in the manner described in our parent application.

Mechanism adapted automatically to position the film in correct relation to all of the feeding members including the take-up spindle and to guide the film as it is propelled from the supply spindle to the supply sprocket, may be constructed as follows:

Pinned to the inner portion of the take-up spindle 3 there may be provided a pinion 401 which meshes with a relatively large gear 402 loosely mounted upon a shaft 403 carried by a take-up operating control plate 404. Mounted upon an inner surface of such gear 402 is a cam plate 404' which is adapted to control a trigger 405 slidably mounted by pins 406 upon the plate 404 and urged downwardly by a spring 407 attached to pins 408 and 409 affixed respectively to the trigger and to the plate 404. As is clearly shown in Figure 9, the lower end of the trigger 405 by means of a pin 410' working in an enlarged slot 410" is attached to a first latch 410 which latch by means of a pin 411 is loosely mounted upon the control plate 404. This latch may consist of a toothed portion 412 urged outwardly by a light spring 413, the head of such trigger bearing against a protuberance 414 upon a second latch 415 which second latch is mounted upon a pin 416 affixed to the lower edge of the plate 132' and held upwardly as viewed in the drawings by a spring 418 one end of which is pinned to the plate 132' and the other end of which is pinned to the latch 415. The movement of such trigger is limited by a projection 419 bearing against a pin 420 upon the plate 132'. Downward movement of the trigger 405 will be effective, as clearly appears from the drawings, for moving the first latch 410 and the second latch 415 downwardly, thereby releasing a head 422 of the second latch and a detent 423 which is formed upon an arm 425 extending upwardly from and movable with the main control plate 404. Following such release, it is obvious that the left hand end of such main control plate 404 will move downwardly from the position shown in Figure 6 to the position shown in Figure 8, such movement being accomplished by a spring 426 and limited by a pin 427. Formed in the extreme left extension of the plate 404 is a slot 430 in which a pin 431 attached to an arm 432 operates. This arm is pinned to a shaft 433 to which also a gear 434 is pinned. This gear 434 meshes with a gear 435 pinned to a shaft 436. To such shaft is fixed an upwardly extending arm 437. Projecting forwardly from such arm 437 is a guiding element 440 which terminates to the right as viewed in the drawings in a circular surface 441 which is adapted to co-act with a hub 442 of a carrier 443 placed upon the take-up spindle 3. Attached to the shaft 433 is an arm 445 which carries at its forward end the guiding element 446 likewise terminating at its right hand portion with a circular plate 447. As is conventional in the art and shown in Figure 10, light leaf springs 441' and 447' may be mounted upon the inner surface of the guides 447 or 441 to force the film close to the hub as it is initially propelled therearound, or dependence can be placed upon the natural curl of the film and the power behind it. The guiding member 448, fixed to the frame F, cooperates with the guide 440.

Similar guiding members for a carrier 450 placed upon the spindle 2 are provided. As is clearly shown in Figure 1, these guiding members are operated by a link 451 extending from the previously described arm 432 to an arm 452 affixed to a gear 453 which meshes with a gear 455, connection between the link 451 and the arm 452 being accomplished by a pin working in a relatively elongated slot. As is clearly shown in Figure 1a, such gears are suitably mounted upon a bracket 456 which extends from the main frame F. Attached to the gear 455 is an upper guide 458 terminating to the right in a guide roller 449. Attached to the gear 453 is a main lower guide 459. Carried upon such guide member 459, is a guide shoe or "shovel" 460, mounted upon pins 461 and 462, such pins working through slots in the member 459. Between the pins 461 and 462 is a compression spring 463 coiled about a rod 464. Substantially horizontal movement of the shoe 460 is obtained by a connection between such shoe and the link 451, such connection comprising an arm 465 attached to guide shoe 460, a pin extending from such arm and working in a relatively long slot in an upper right angled extension 466 of a pivotally mounted link 467, a lower right angled extension 468 of such link being attached to a link 451 by a pin working in a relatively long slot. It will thus be evident that the movement of the arm 432 will be effective to bring together or apart the guides 458 and 459, and to move the shoe 460 toward or away from the spindle 2.

Embracing the periphery of the supply reel 450 there may be provided a guide 470 whereby the film upon the revolution of the reel 450 is prevented from leaving the reel except through the opening between the guiding elements 458 and 460.

In order to form a completely enclosed channel or track for the film, all guiding elements and the film retaining elements—including members 123, 127, 131, 134, 440, 446, 448, 458, 459 and 460—are preferably provided with both outer and inner sides or flanges which form contact with each other or with the appropriate portion of the apparatus, when such members are in the operative or guiding position, to form such enclosed channel. For clarity, such sides or flanges are omitted from the drawings, their construction being obvious. Guide 470 may be provided with such an outer flange. Side positioning and retaining fingers, as described in our parent application, may also be employed.

For controlling the operation of the apparatus in the manner desired, there is preferably provided a single control member in the form of a knob or button 139 projecting through a substantially U shaped slot 140 in the supporting base B, as is best shown in Figures 3 and 4. This slot is so shaped as to provide five operating stations designated respectively S1, S2, S0, S3 and S4. The button 139 is adapted to be moved at will so that the control mechanism will occupy any one of these stations. With the control at the station S1, the respective parts of the apparatus are in such position as to insure the normal projection of pictures as usual motion pictures. With the control button at station S2, there is obtained a so-called still or stereopticon projection, the movement of the button from the station S1 to the station S2 being effective for disengaging the respective driving mechanisms which are in operation during the projection of pictures in motion. With the control button at the intermediate position, station S0, mechanical timing of the actuation of the control and guiding mechanisms becomes automatically operative as described in our parent application. With the button in position at station S3, the respective parts of the apparatus are in such position as to permit the positioning of a film therein or the removal of a film which has just been fed therethrough. It will be understood that the movement of the button from station S0 to station S3 automatically produces the required change in the operating position of the parts. With the button in position at station S4, the respective parts of the apparatus are in such position as to permit rewinding of the film by means of the motor M. The movement of the button from station S3 to station S4 automatically produces the required change in operating conditions necessary for such rewinding.

The construction and operation of this control mechanism is illustrated and claimed in our parent application and only so much thereof as is necessary for an understanding of the present invention will be repeated herein.

The above described single control member 139 may be mounted for moving a swinging lever 148 which is pivotally attached to an upwardly extending gate control rod 152. A connection between the lever 148 and the shaft 186, such connection being shown in our parent application may operate the various clutches by means of which the motor drives the various film moving members, or, alternatively, any desired automatic or non-automatic means for starting the drive of the spindle 3 and the other film moving members may be employed.

To illustrate the actuation of the device to project motion pictures, it will be assumed that the user places a film carrier upon the spindle 2 and moves the control button from station S3 to the intermediate station S0. Such movement, as will be made fully apparent in a following portion of this specification, will have rotated the gate control rod 152 thereby having retracted the stripping shields 71, 115, and 116 moved the shoe 85 and the guiding rollers 123 and 131 toward the sprockets 50, 89 and 90, moved the guides 127 and 134 away from the sprockets 89 and 90, partially closed the gate and moved the guiding elements 458 and 460 toward each other, forming a completely enclosed path or tunnel for the film, and similarly moved the guides 441 and 447 toward each other. The guide shoe 460 will be pressed against the film upon the supply reel 450, the light spring 463 bringing it into contact with the film irrespective of minor variations in diameter of the mass upon the reel and protecting the outer convolutions of the film from injury from the shoe. Thereafter, automatically as described in our parent application or in any desired manner, the supply spindle, the supply sprocket, and the intermittent sprocket may be actuated. Such actuation of the supply spindle will be effective to revolve the supply carrier in a feeding direction. Escape of the end of the film, except through the passage way framed by the guiding members 458 and 460 and 459 is prevented by the guiding ring 470, and the guiding shoe 460 is effective for picking up the free end of the film and guiding it into the passage way. What slight scratching effect, if any, is produced by the shoe is immaterial since the leader or forward end of the film is ordinarily not image bearing. Continued revolution of the supply carrier forces this free end of the film to the supply sprocket 89, with which it engages. Such sprocket feeds it on to the intermittent sprocket 50 with which it engages, such sprocket being operated if desired for a relatively brief period merely to assure such engagement. At that moment, the supply spindle and the intermittent sprocket may be rendered inoperative as described in our parent application or otherwise. The upper loop guide 127 will be withdrawn from guiding position, in the manner later described. At this point the two necessary loops of unsupported slack film may be created, one adjacent the supply sprocket and one adjacent the take-up sprocket. Thereafter all sprockets and the take-up spindle may be placed in simultaneous operation. Thus the free end of the film will be fed to the carrier upon the take-up spindle, which will begin to revolve at approximately the time the film reaches such carrier. Rotation of the rod 152 first effective to move the arm 130" whereby through the link 130 the upper loop guide 127 is moved to inoperative position and the final gate closing movement begins. The continued rotation of rod 152 is effective to complete the closing of the gate and to retract the lower loop guide 134 through the operation of the slotted link 137.

As the film is fed forwardly by the simultaneous operation of all of the feeding sprockets it is forced through the passage way formed by the guiding elements 446 and 440 and around the hub 442 of the take-up carrier 443 upon the take-up spindle 3, the film being guided about the revolving hub by the circular guiding plates 441 and 447. The continued powered operation of the driving spindle 3 and the carrier 443 thereupon will be effective to wrap the film about the hub 442 thus firmly attaching the end of the film thereto. After a predetermined number of revolutions of the spindle 3, the pinion 401 will have been effective to have completely revolved the relatively large gear 402 from the position shown in Figure 6 to that shown in Figure 8. The ratio of the pinion 401 to the gear 402 may be any which is found effective, it being preferred under some circumstances that such ratio be approximately 10 to 1 whereby the guiding elements are moved to inoperative position after ten revolutions of the hub 442. As the cam plate 404' is moved slightly beyond the position shown in Figure 6, the trigger 405 will be moved sharply downwardly by the spring 407 thus moving the latch 415 downwardly and permitting the detent 423 to be freed thereby and the operating plate 404 to move from the position shown in Figure 6 to that shown in Figure 8, such movement being effective for separating the guiding elements 447 and 441, and 446 and 440, and 458, and 459 and 460, and also moving the gear 402 away from and out of connection with the pinion 401. It will thus be seen that the various guiding elements are moved to inoperative position without placing the slightest strain upon the film, and that they are so moved in definitely timed relation to the beginning of the operation of the take-up spindle, which in turn is actuated in a definitely timed relation to the actuation of the other feeding member and the closing of the gate.

Movement of the control mechanism from station S0 to station S3 will be effective for opening the gate, for moving the film rollers and guides 123, 127, 131 and 134 and their associated parts to film threading position, and for so actuating the stripping shields 71, 115, and 116 as to effect the desired bodily removal of the film from the sprockets 50, 89 and 90 and the shielding of such sprockets so as to facilitate the threading of a new film into position or to permit the rewinding of a film.

Adjacent its upper portion there is secured to the gate control rod 152 an arm 252' to which is attached a link 253' attached to the arm 125 previously described. Movement of the control button from station S0 to station S3 will be effective for rotating the gate control rod in a counter clockwise direction as viewed in Figure 3 and moving the link 253' to the left as viewed in Figure 2 thus moving the pin 127b over the center of the slot 127c in the upper right angled extension 127d of the spring 127a attached to the main frame F, and quickly raising the film retaining or idler rollers 123 and 127 to relatively distant relation to the sprockets 89 and 90 respectively. Such upward movement of the control plate 132' upon the pivot 133 will be effective to move the trigger 415 to the left as viewed in Figure 8 and its tooth 422 into engagement with the detent 423 affixed to the upwardly extending arm 425. A subsequent downward movement of the plate 132', because the above connection has been established, will move the plate 404 to the right as viewed in Figure 8 to the position of Figure 6 thereby placing the pinion 401 in mesh with the gear 402 preparatory to the next cycle of operation.

Such rotation of the gate control rod 152 will also be effective to move the arm 254' attached thereto to the left as viewed in Figure 1, thus through the medium of the pin 255' attached to the gate control rod 48 moving such rod to the left as so viewed, thus separating the gate sections, and actuating the stripping shields. The accelerated motion provided by the spring 127a is effective for preventing interference between the idlers and the stripping shields. Such rotation of the rod 152 will also be effective, through the arm 130" attached thereto, the pin working in the elongated slot 130' therein, and the link 130 to move the upper loop idler to guiding position adjacent the supply sprocket 89. The lower loop guide 134 cooperating with the take-up sprocket 90 is directly operated by the movable section 46 of the gate.

With the control button 139 at station S3, it will be understood that the gate is completely open, the guides 127 and 134 relatively close to the film path, the film retaining rollers 123 and 131 completely withdrawn from the sprockets 89 and 90 respectively, and the guides associated with the supply and take-up spindles in open position. The user thereupon places the reel 450 upon the spindle 2. It is not necessary that the end of the film be placed in any particular relation to the guiding elements. The user thereupon moves the control button 139 from station S3 to station S0. Such movement of the button toward station S0 is effective for rotating the gate operating rod 152 through the pin 152' attached thereto, thus partially closing the gate, rotating the stripping shields into inoperative position, and bringing the film retaining elements 123 and 131 into relatively close relation with the appropriate sprockets. The movement of the rollers 123 and 131 into pressing relation with the sprockets 89 and 90 respectively also resets the gear 402 and the pinion 401 which operate the spindle guides.

Certain of the advantages of our invention have been stated in the above portion of this application and other advantages will be clear therefrom and from the drawings which are a part hereof and the claims which are appended hereto. Other advantages include the provision of improved guiding and operating mechanism positively controlled and embodying various operable members sequentially operated for the automatic threading of an apparatus for the handling of film or other strip material.

We claim:

1. In a film handling apparatus, a live spindle, means for revolving said spindle, a frictional connection between said spindle and said revolving means, operable film guiding means associated therewith, and operating mechanism interlocking said spindle and said guiding means for directly operating said guiding means by the revolution of said spindle whereby the operation of said guiding means is determined by the revolution of said spindle irrespective of the slippage between said spindle and said revolving means.

2. In a film handling apparatus, a revoluble spindle adapted for the mounting of a reel thereon, guiding means for causing a propelled film end to be wound automatically upon a reel which is mounted upon said spindle, means for moving said guiding means to inoperative position, and an operating motion transmitting connection between said spindle and said moving means for automatically controlling said moving means by power which is directly transmitted thereto by the revolution of said spindle.

3. In a film handling apparatus, a revoluble spindle adapted for the removable mounting of a carrier thereupon, means for guiding the free end of a film to and about the core of a carrier positioned upon said spindle, said guiding means including film contacting mechanism movable between a first position wherein it surrounds said core and is positively supported other than by the film whereby said free end of the film is directed about said core and wherein it is spaced from said core whereby the film is free from the weight thereof, and a second position wherein it is disposed relatively distantly from said core and free from directing and guiding relation to the film, and operating mechanism for said film contacting mechanism, said operating mechanism including means for maintaining said film contacting mechanism in said first position until said spindle has been revolved a predetermined number of times and thereafter moving said film contacting mechanism from said first to said second position and an actuating connection between said spindle and said last previously mentioned means whereby said means is operated in accordance with the number of revolutions of said spindle.

4. In a film handling apparatus, a film winding core, a spindle adapted to support and revolve said core, a revoluble driving element for said spindle, impositive means for transmitting the power of said driving element to said spindle whereby the rate of revolution of said spindle and the core supported thereby changes as the mass of film supported thereby changes, guiding means leading to and embracing at least a portion of said core for directing a film to and about said core, said guiding means including a movable guiding member, means for moving said movable member in relation to said core, and an operating connection between said spindle and said moving means for operating said moving means upon a predetermined number of revolutions of said spindle irrespective of the number of revolutions of said driving element.

5. In a film handling apparatus, a revoluble spindle adapted for the removable mounting of a carrier thereupon, operable guiding means for directing the free end of a propelled film to a carrier positioned upon said spindle, operating mechanism connecting said spindle and said guiding means for operating said guiding means by the revolution of said spindle, and means for rendering said connecting mechanism inoperative.

6. In a film handling apparatus, a revoluble spindle adapted for the removable mounting of a carrier thereupon, operable guiding means for directing the free end of a propelled film in relation to a carrier positioned upon said spindle, mechanism connecting said spindle and said guiding means for operating said guiding means by the revolution of said spindle, and means necessarily effective for rendering said connecting mechanism inoperative upon a pre-determined number of revolutions of said spindle.

7. In a film handling apparatus, a revoluble spindle adapted for the removable mounting of a carrier thereupon, means for establishing a channel for guiding a film in relation to a carrier positioned upon said spindle, said guiding means including a film contacting member movable in relation to a position wherein it establishes a portion of said channel, means for moving said film contacting member, a driving member for operating said moving means, mechanism for disconnecting said driving member and said moving means, and means operatively interconnecting said disconnecting mechanism and said spindle for rendering said disconnecting mechanism operative upon a predetermined number of revolutions of said spindle, whereby said moving means is disconnected from its driving member after said spindle has been revolved a predetermined number of times.

8. In a film handling apparatus, a revoluble spindle, means for guiding a film in relation to a carrier positioned upon said spindle, means for moving said guiding means to inoperative position, an actuating member operable by the revolution of said spindle, an operating connection between said actuating member and said moving means, and means for bringing said actuating member into and out of operative relation with said spindle.

9. In a film handling apparatus, a revoluble spindle, means for guiding a film in relation to a carrier positioned upon said spindle, a spring for moving said guiding means to inoperative position, a latch for holding said spring under tension and preventing such movement, and control mechanism operatively interconnecting said latch and said spindle for withdrawing said latch from holding relation to said spring upon a predetermined movement of said spindle thereby applying the power of said spring to move said guiding means to inoperative position.

10. In a film handling apparatus, a revoluble spindle, means for revolving said spindle, means for guiding a film in relation to a carrier positioned upon said spindle, means for moving said guiding means to inoperatve position, and control mechanism for said moving means, said control mechanism including a cam formation, a connection between said cam formation and said moving means for operating said moving means upon a predetermined movement of said cam formation, and a direct connection between said spindle and said cam formation for moving said cam formation by the revolution of said spindle.

11. In a film handling apparatus, a revoluble spindle, means for guiding a film in relation to a carrier positioned upon said spindle, means for moving said guiding means to inoperative position, and control mechanism for said moving means, said control mechanism including a cam formation, a member operatively interconnecting said cam formation and said moving means for actuating said moving means upon predetermined movement of said cam formation, a connection between said spindle and said cam formation for moving said cam formation by the revolution of said spindle, and means operated concomitantly with the operation of said moving means for destroying such operative connection between said spindle and said cam formation.

12. In a film handling apparatus, a revoluble film supporting spindle, means establishing a path wherein a film is guided in relation to said spindle, said guiding means including at least one movable film contacting member, and mechanism for moving said member in relation to said path, said moving mechanism including a first gear revoluble with said spindle, a second gear mounted for bodily movement from and to operative contact with said first gear, means operated by the revolution of said second gear for bodily moving said second gear out of operative contact with said first gear after a predetermined number of revolutions thereof, and a connection between said second gear and said movable member for moving said film contacting member in relation to said path by the bodily movement of said second gear.

13. In a film handling apparatus, a revoluble film supporting spindle, means for establishing a path wherein a film is guided in relation to said spindle, said guiding means including at least one movable film contacting member, and mechanism for moving said member in relation to said path, said moving mechanism including a first gear revoluble with said spindle, a second gear mounted for bodily movement from and to operative contact with said first gear, a spring for bodily moving said second gear, a latch for said spring, a cam formation movable by said second gear to a predetermined position, a follower cooperating with said formation for releasing said latch when said cam formation is moved to said position thereby causing said spring bodily to move said second gear, and a connection between said second gear and said movable film contacting member for moving said film contacting member in relation to said path upon the movement of said second gear under the influence of said spring.

14. In a film handling apparatus, a revoluble spindle adapted for the removable mounting of a carrier thereupon, guiding means for establishing a path for a film in relation to said spindle, said guiding means including a film contacting member movable from and to guiding position, means for moving said film contacting member away from guiding position, powered means for operating said moving means, a control member movable to an operative position wherein it sets said powered means so that it can operate said moving means when power is applied, and means for concomitantly moving said control member to said operative position and for moving said film contacting member to guiding position.

15. In a film handling apparatus, a revoluble spindle adapted for the removable mounting of a carrier thereupon, means for guiding a film in relation to a carrier positioned upon said spindle, said guiding means including a film contacting member movable from and to guiding position, means for moving said film contacting member, an operating member movable to a predetermined position, a connection between said operating member and said moving means for operating said moving means upon the movement of said operating member to said position, a driving member for moving said operating member to said position, and means for destroying the operative relation of said driving member and said operating member after the movement of said operating member to said predetermined position.

16. In a film handling apparatus, a spindle adapted for the removable mounting of a carrier thereupon, means for guiding a film in relation to said carrier, said guiding means comprising a plurality of members two of which are movable in relation to each other to a relatively close position wherein they define a path for the film therebetween and one of which is movable in a direction substantially parallel to such path for lengthening one side of said path.

17. In a film handling apparatus, a spindle adapted for the removable mounting of a carrier thereupon, means for guiding a film in relation to said carrier, said guiding means comprising a plurality of members two of which are movable in relation to each other to a relatively close position wherein they define a path for the film therebetween and one of which is movable in a direction substantially parallel to such path for lengthening said path, and control means operatively interconnecting said guiding members for moving said members concomitantly.

18. In a film handling apparatus, a spindle adapted for the removable mounting of a carrier thereupon, means for guiding a film in relation to said carrier, said guiding means comprising two complementary members, each mounted for movement with a gear, said gears being disposed in cooperative relation with each other, and means for rotating said gears in one direction, for moving said guiding members to a cooperative relation wherein they define a path therebetween for the film, or in another direction for moving said members away from such complementary position for destroying such path.

19. In a film handling apparatus, a spindle adapted for the removable mounting of a carrier thereupon, a guiding element surrounding said spindle and disposed at a slightly greater distance therefrom than the radius of the carrier which is to be mounted thereupon, an opening in such guiding member, a member for feeding the film which is supported by said carrier, and complementary guiding members movable to a first position in guiding relation to the boundaries of such opening wherein they form a channel between said opening and said feeding member for guiding the free end of the film supported by said carrier therefrom to said member or to a second position wherein said members are positioned outside of said opening and out of cooperative relation with the film.

20. In a film handling apparatus, a revoluble spindle adapted for the removable mounting of a film-supporting carrier thereupon, a member for feeding the film supported by such carrier, and means for guiding the free end of a film along the path between said carrier and said feeding member, said means including a guiding member longitudinally movable in a direction substantially parallel to such path to a position within the periphery of said carrier and means for moving said member to such position and to a position outside of the periphery of said carrier.

21. In a film handling apparatus, a revoluble spindle adapted for the removable mounting of a film-supporting carrier thereupon, a member for feeding the film supported by such carrier, and means for guiding the free end of a film along the path between said carrier and said feeding member, said means including a guiding member longitudinally movable in a direction substantially parallel to such path to a position within the periphery of said carrier, means for moving said member between said position and a position outside of the periphery of said carrier, and resilient means effective while said member is disposed in said first mentioned position for pressing said guiding member against the film upon said carrier whereby said member engages the free end of the film upon the revolution of such carrier.

22. In a film handling apparatus, a revoluble spindle adapted for the removable mounting of a film supporting carrier thereupon, a feeding member for drawing film from such carrier, a guiding member movable in a direction substantially parallel to the path of the film between said carrier and said feeding member and movable into engagement with the film supported by said carrier, whereby the free end of such film is directed away from said carrier and toward said feeding member, the film engaging portion of such member being inclined in the direction opposite to that in which said carrier is revolved, and means for moving said guiding member into and out of engagement with the film.

23. In a film handling apparatus, a film supporting spindle, a member for feeding a film supported by said spindle, operable means for guiding the film between said member and said spindle, means for retaining the film in operative relation with said feeding member, and sequential control mechanism interlocking said guiding means and said film-retaining means, said control mechanism including devices for moving said film-retaining means and said guiding means to operative position substantially simultaneously and for moving said means to inoperative position at different times.

24. In a film handling apparatus, a film supporting spindle, a sprocket for feeding a film supported by said spindle, an operable guiding member for directing the film between said sprocket and said spindle, an idler for said sprocket movable relatively thereto and to said guiding member, and operating mechanism interlocking said idler and said member and for concomitantly moving said idler and said member to operative position.

25. In a film handling apparatus, a revoluble film supporting spindle, a member for feeding a film supported by said spindle, operable means for guiding the film between said member and said spindle, operable means for holding the film in operative relation to said feeding member, and control mechanism interlocking said guiding means and said film holding means, said mechanism including means operated by said spindle for moving said guiding means to inoperative position and means operated by said film holding means for moving said guiding means into operative relation to said spindle.

26. In a film handling apparatus, a revoluble film supporting spindle, a sprocket for feeding a film supported by said spindle, an operable member for guiding the film between said sprocket and said spindle, an idler for said sprocket, means for moving said idler from and toward said sprocket, and control mechanism operatively interconnecting said spindle, said member and said idler and including devices for rendering the revolution of said spindle effective to move said guiding member to inoperative position and out of operative relation with said idler and for rendering the movement of said idler away from said sprocket effective to reestablish the operative connections between said idler and said guiding member.

27. In a film handling apparatus, a film supporting spindle, a member for feeding a film supported by said spindle, guiding means for establishing a path for the film between said member and said spindle, said guiding means including a film contacting member movable in relation to said path, means for moving said member in relation to said path, a presser member movable to a position wherein it retains the film in operative relation with said feeding member and another position relatively remote therefrom, means for moving said presser member between said positions, and control mechanism operatively interconnecting both of said moving means and effective for concomitantly operating each of said moving means.

WARREN DUNHAM FOSTER.
FREDERICK DAVENPORT SWEET.